Oct. 30, 1951             H. L. GORDEN             2,573,008
ALL-PURPOSE AUTO PARTS CLEANER
Filed Aug. 14, 1946                                2 SHEETS—SHEET 1
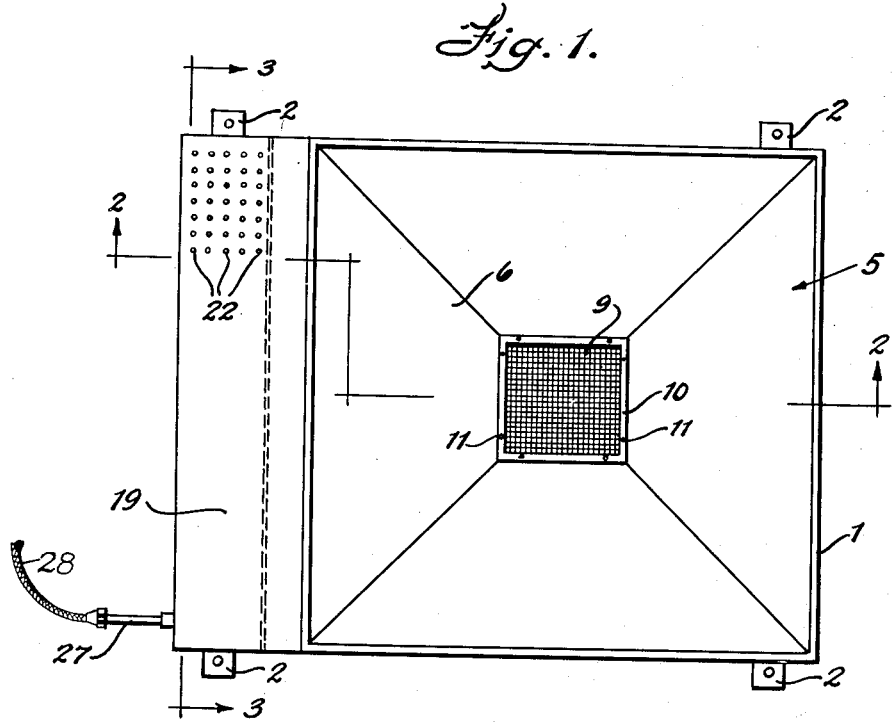
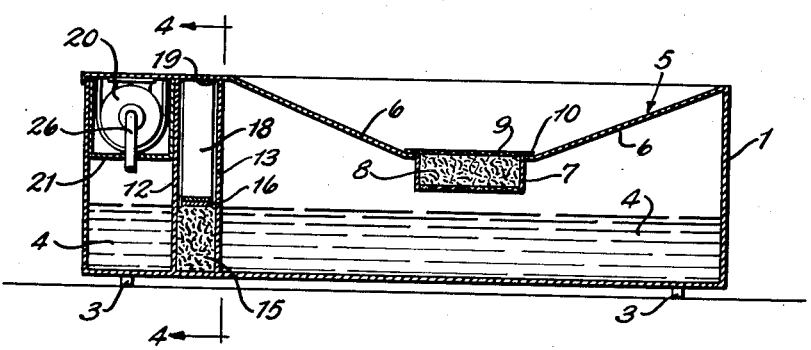
Inventor
Howard L. Gorden.
By Clarence A. O'Brien
and Harvey B. Jacobson
Attorneys Oct. 30, 1951      H. L. GORDEN      2,573,008
ALL-PURPOSE AUTO PARTS CLEANER
Filed Aug. 14, 1946      2 SHEETS—SHEET 2

Inventor
Howard L. Gorden.

By Clarence A. O'Brien
and Harvey B. Jacobson
Attorneys

Patented Oct. 30, 1951

2,573,008

UNITED STATES PATENT OFFICE 2,573,008

ALL-PURPOSE AUTO PARTS CLEANER

Howard L. Gorden, Painesville, Ohio

Application August 14, 1946, Serial No. 690,527

4 Claims. (Cl. 134—111)

This invention relates to improvements in all purpose auto part cleaners which may be slid under any portion of an automobile to spray cleaning fluid upon the grease covered part which is to be worked on or repaired.

An object of the invention is to provide an all purpose auto part cleaner which will be supported upon casters, and which may be readily slid under any portion of an automobile, to pump a stream of cleaning fluid on a greasy part of the automobile which is to be worked on, said grease being removed and falling in a grease can or tray positioned in the upper portion of said cleaner body, after which the soiled or dirty cleaning fluid will be filtered twice before it is again pumped over the greasy parts of the automobile.

Another object of the invention is to provide an improved portable all purpose auto part cleaner comprising a removable tray supported in the upper portion of a receptacle or tank in which a supply of cleansing fluid is received, together with a motor driven fluid pump disposed in the end of the device whereby the fluid will be twice run through filters to be again used in cleaning the greasy parts of the automobile or other mechanism.

Another object of the invention is to provide an all purpose auto part cleaner which will be adapted to be rolled under any portion of an automobile which will be worked upon, and a stream of cleansing fluid pumped on said part prior to the actual work being done so that the mechanic will have an unobstructed view of the mechanism.

A still further object of the invention is to provide an all purpose auto part cleaner which will be highly efficient in operation, and relatively inexpensive to manufacture and produce.

Other objects will appear as the description proceeds.

In the accompanying drawings which form a part of this application,

Figure 1 is a plan view of the improved all purpose auto part cleaner;

Figure 2 is a transverse sectional view taken on the line 2—2 of Figure 1;

Like characters of reference are used throughout the following specification and the accompanying drawings to designate corresponding parts.

Figure 3:
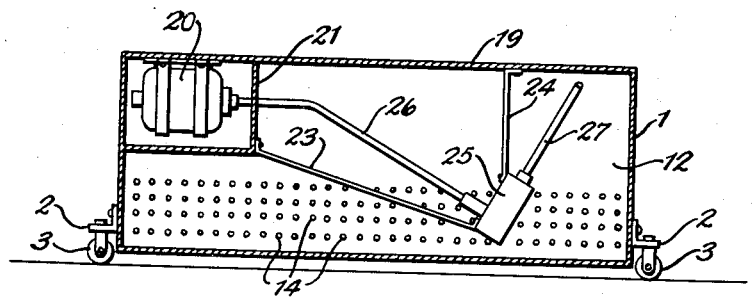
Figure 3 is a sectional view taken on the line 3—3 of Figure 1.

In carrying out the present invention, there is provided a substantially rectangular shaped tank generally designated by the reference numeral 1, the same being provided with the laterally extending brackets 2 adjacent the corners thereof, and in which are supported the rollers or casters 3 which support the tank a slight distance above the ground level so that the same may be rolled under any portion of an automobile upon which work is to be done.

The tank or body 1 is divided into two separate compartments, the first compartment being the larger compartment in which cleansing fluid 4 will be placed, and which will be covered by a removable tray 5 suitably secured at the upper portion or top of said tank 1. The removable tray 5 is substantially square, and is provided with four sloping walls 6, which support the square filter housing 7 in which steel wool 8 is packed. The top of the square filter housing 7 is covered by the coarse mesh screening 9 fitted within the square frame 10, and secured to the adjacent edges of the walls by means of the screws or bolts 11. The lower portion of the square filter housing 7 will be provided with a perforated closure so that the dirty fluid falling into the removable tray may pass through said filter to be cleaned and into the cleaning fluid in the lower portion of the tank 1.

Figure 4:
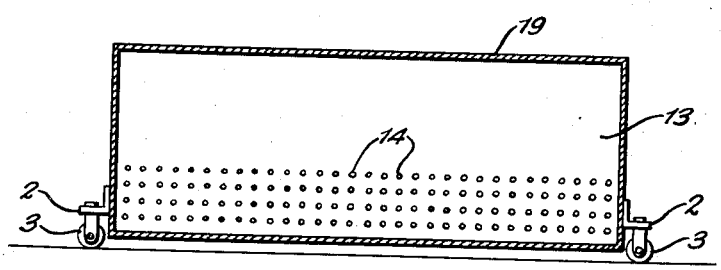
Figure 4 is a sectional view taken on the line 4—4 of Figure 2.
Figure 5:
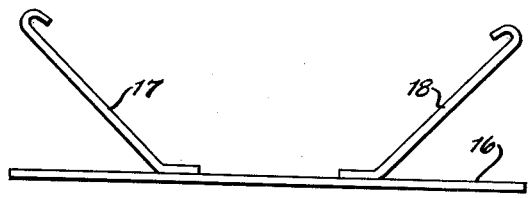
Figure 5 is a side elevation of the clip device for holding the steel wool within the filter chamber.

A second filter housing extends transversely of the tank 1 adjacent one end thereof, and is formed by the spaced walls 12 and 13 which are provided with the perforations 14 formed through their lower ends, as clearly illustrated in Figures 3 and 4 of the drawings. Steel wool 15 will be secured within the lower portion of the filter casing between the spaced walls 12 and 13, and will be compressed therein and held by means of the pressure plate 16 to which the upwardly and outwardly extending spring holding clips or arms 17 and 18 are secured to be engaged under the adjacent portion of the cover 19.

A small electric motor, preferably of approximately 1/20 of a horsepower and denoted by the reference numeral 20 is supported within the compartment 21 in the upper corner of the end of the tank 1, the cover portion immediately thereover being formed with a plurality of apertures 22 whereby air may pass through to cool or ventilate the motor.

A pair of spaced supporting bracket members 23 and 24 are secured respectively to the compartment 21 and to the cover 19, and support the gear driven pump 25, which is connected by means of the flexible shafting 26 extending through the compartment 1 to be connected with the motor shaft of the electric motor 20. The gear driven pump 25 will be disposed adjacent the lower portion of or adjacent the bottom of the tank 1 and will have its inlet end close to the said bottom, while an outlet tube 27 extends upwardly from the discharge end of the pump, and is adapted to receive a section of rubber hose 28 which may or may not support a suitable nozzle and valve for controlling the same (not shown).

From the foregoing description, it will be apparent that when any work is to be done underneath an automobile, the improved all purpose auto part cleaner will be rolled upon its casters 3 under that portion of the automobile which is to be worked on. The tank will be filled approximately one-third full of cleansing fluid, and the mechanic will start the electric motor which will be connected with a suitable source of electrical energy or electric current supply (not shown), and will grasp the hose connected with the outlet tube 27 and will direct a stream of cleansing fluid upon that portion of the automobile which is to be worked upon, thereby removing and cleansing that part of the oil and grease which is caked underneath the chassis of all automobile. The dirty cleansing fluid and grease will fall down into the sloping walls of the removable tray 5, and will pass through the filter housing 7 and through the steel wool 8, and drop back into the cleansing fluid in the tank 1. As the cleansing fluid is pumped from the small compartment at the end of the tank, the fluid in the main portion of the tank seeking to reach a common level will pass through the second filter of steel wool 15 to be further cleansed, to then be mixed with the cleansed fluid in the pump compartment. It will therefore be seen that when the cleansing fluid is once placed within the device, it may be used repeatedly for cleansing parts of an automobile which are to be worked upon, and when said fluid has accumulated so much dirt that it is of little value, the same may be readily pumped from the tank by means of the gear driven pump 25, after which new cleansing fluid may be substituted therefor.

From the foregoing description, it will be apparent that there has been devised and provided a highly efficient form of all purpose auto parts cleaner, which may be readily manufactured at a relatively low cost.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An all purpose auto parts cleaner comprising a wheeled container, a main tank and auxiliary tank in said container, perforated walls separating said tanks, a filter within said walls, said tanks being adapted to contain cleansing fluid, a removable inwardly sloping tray seated within said main tank, a filter disposed centrally of said tray, a gear pump in said auxiliary tank, and means connected with said gear pump for directing the filtered cleansing fluid from the gear pump upon greasy parts of an automobile disposed above said tray.

2. Combination of claim 1, a cover for said auxiliary tank, bracket members secured to one side of said auxiliary tank and to said cover forming a compartment in said auxiliary tank, an electric motor, for operating said gear pump, secured to the underside of the cover and within said compartment, means connected with said compartment and cover for holding the pump adjacent the bottom of said smaller tank, a flexible shafting connected between said pump and said motor, an outlet from said gear pump, and a hose connected with said outlet.

3. An all purpose auto parts cleaner comprising a container, a pair of laterally spaced perforated walls mounted in said container and separating said container into a main tank and auxiliary tank, said tanks being adapted to contain cleansing fluid, a filter disposed between said walls, a removable inwardly sloping tray seated within said main tank, a filter disposed centrally of said tray, a gear pump in said auxiliary tank, and means connected with said gear pump for directing filtered cleansing fluid from the gear pump upon the greasy parts of an automobile disposed above said tray.

4. The combination of claim 3, including a cover for said auxiliary tank, a plate disposed between said laterally spaced walls, means carried by said plate and engaging said auxiliary tank cover for urging said plate into compressing engagement with the filter disposed between said walls.

HOWARD L. GORDEN.

REFERENCES CITED

The following references are of record in the file of this patent:

UNITED STATES PATENTS

| Number | Name | Date |
|---|---|---|
| 158,684 | Cosgrove | Jan. 12, 1875 |
| 935,201 | Hallauer | Sept. 28, 1909 |
| 1,382,915 | Huggins | June 28, 1921 |
| 2,044,524 | Caise | June 16, 1936 |
| 2,352,356 | Albertson | June 27, 1944 |
| 2,385,393 | Wilson | Sept. 25, 1945 |